US008356308B2

(12) United States Patent
Toub et al.

(10) Patent No.: US 8,356,308 B2
(45) Date of Patent: Jan. 15, 2013

(54) BLOCKING AND BOUNDING WRAPPER FOR THREAD-SAFE DATA COLLECTIONS

(75) Inventors: Stephen Toub, Seattle, WA (US); Joe Duffy, Renton, WA (US); Samer El Baghdady, Redmond, WA (US); Emad Ali, Cairo (EG); Igor Ostrovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1262 days.

(21) Appl. No.: 12/131,123

(22) Filed: Jun. 2, 2008

(65) Prior Publication Data

US 2009/0300766 A1 Dec. 3, 2009

(51) Int. Cl.
*G06F 3/00* (2006.01)
*G06F 9/46* (2006.01)

(52) U.S. Cl. ......... 719/328; 718/100; 718/107; 718/108

(58) Field of Classification Search .................. None
See application file for complete search history.

(56) References Cited

U.S. PATENT DOCUMENTS

| 5,465,363 | A | | 11/1995 | Orton et al. | |
|---|---|---|---|---|---|
| 5,473,777 | A | * | 12/1995 | Moeller et al. | 719/328 |
| 5,481,706 | A | | 1/1996 | Peek | |
| 5,519,867 | A | * | 5/1996 | Moeller et al. | 718/107 |
| 6,615,216 | B1 | | 9/2003 | Hu | |
| 7,219,198 | B2 | | 5/2007 | Sivaram et al. | |
| 7,328,316 | B2 | | 2/2008 | Moir et al. | |
| 7,353,495 | B2 | * | 4/2008 | Somogyi | 718/100 |
| 7,958,512 | B2 | * | 6/2011 | Lupu et al. | 718/107 |
| 2002/0059358 | A1 | * | 5/2002 | Kanamori | 709/107 |
| 2003/0182462 | A1 | | 9/2003 | Moir et al. | |
| 2004/0003188 | A1 | * | 1/2004 | Rao | 711/154 |
| 2004/0107227 | A1 | | 6/2004 | Michael | |
| 2004/0139434 | A1 | * | 7/2004 | Blythe et al. | 718/100 |
| 2005/0240943 | A1 | * | 10/2005 | Smith et al. | 719/328 |
| 2006/0015872 | A1 | * | 1/2006 | Pohl et al. | 718/100 |
| 2007/0079071 | A1 | | 4/2007 | Saha et al. | |
| 2007/0234368 | A1 | | 10/2007 | Shankar | |
| 2008/0066066 | A1 | * | 3/2008 | MacPherson | 718/100 |
| 2009/0193442 | A2 | * | 7/2009 | Orton et al. | 719/328 |

OTHER PUBLICATIONS

Bing Liu et al, A Small for Heterogeneous Mobile Devices, 05, IEEE, pp. 1-8.*
Peng Li et al., Combining Events and Threads for Scalable Network Services, 2007, pp. 1-11.*
Van Bui, A Runtime Performance/Event Monitoring Interface for OpenMP, 2007, pp. 1-99.*
Ramamurhty, "A Lock Free Approach to Object Sharing in Real Time Systems" Chapel Hill 1997. 237 pages.
Morris, "Algorithms and Data Structures for Haptic Rendering: Curve Constraints, Distance Maps, and Data Logging", Stanford University Department of Computer Science Technical Report Jun. 2006.pp. 1-12.

(Continued)

*Primary Examiner* — Andy Ho
*Assistant Examiner* — Tuan Dao
(74) *Attorney, Agent, or Firm* — Ogilvie Law Firm

(57) ABSTRACT

A membership interface provides procedure headings to add and remove elements of a data collection, without specifying the organizational structure of the data collection. A membership implementation associated with the membership interface provides thread-safe operations to implement the interface procedures. A blocking-bounding wrapper on the membership implementation provides blocking and bounding support separately from the thread-safety mechanism.

20 Claims, 5 Drawing Sheets

OTHER PUBLICATIONS

Gidenstam, et al., "Efficient and Reliable Lock-Free Memory Reclamation Based on Reference Counting", Proceedings of the 8th International Symposium on Parallel Architectures, Algorithms and Networks (ISPAN'05). 6 Pages.

Moir, "Practical Implementations of Non-Blocking Synchronization Primitives", 1997 PODC Santa Barbara, USA. pp. 219-228.

Duffy, "CLR Inside Out: 9 Reusable Parallel Data Structures and Algorithms", 2008 Microsoft Corporation. http://msdn2.microsoft.com/en-us/magazine/cc163427(printer).aspx.

"Java Programming/Collection Classes", Wikihooks, the cipen-content textbooks collection, Mar. 15, 2008, XP002653153, Retrieved from the Internet: URL: http://web.archive.org/web/20080315054231/http://en.wikibooks.org/wiki/Java_programming/Collection_Classes [retrieved on Sep. 19, 2011], pp. 14.

Lea et al: "the java.util.concurrent synchronizer framework", Science of Computer Programming, vol. 58, No. 3, Dec. 1, 2005, pp. 293-309, XP025258554, Elsevier BV, NL ISSN: 0167-6423; DOI: 10.1016/J.SCICO.2005.03.007 [retrieved on Sep. 19, 2011].

International Search Report and Written Opinion, PCT/US2009/042615, Dec. 21, 2009.

Benton, et al., "Modern Concurrency Abstractions for C#", ACM Transactions on Programming Languages and Systems, Sep. 2004, vol. 26, Issue 5, p. 769-804.

* cited by examiner

BLOCKING AND BOUNDING WRAPPER FOR THREAD-SAFE DATA COLLECTIONS

BACKGROUND

Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations.

Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

SUMMARY

In some embodiments, a membership interface supports an operation to change the number of data elements in a data collection. A membership implementation is associated with the membership interface. The data collection has an organizational structure which is unspecified in the membership interface but is specific in the membership implementation. A blocking-bounding wrapper on the membership implementation performs a blocking-bounding operation in response to an invocation of the membership interface. For example, in some embodiments a blocking operation suspends execution during an attempt to remove a data element from the data collection while the data collection lacks a data element available for removal. Similarly, in some embodiments a bounding operation suspends execution during an attempt to add a data element to the data collection when memory space or another resource needed to add the data element is lacking.

In some embodiments, the blocking-bounding wrapper provides blocking and bounding support for any data collection that supports a minimal interface, e.g., for data collections that provide an add-element procedure and a remove-element procedure. In particular, some embodiments support blocking and bounding on thread-safe operations that add or remove data elements. In some embodiments, blocking-bounding semantics and thread-safe operations are combined while managing multiple heterogeneous data collections.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
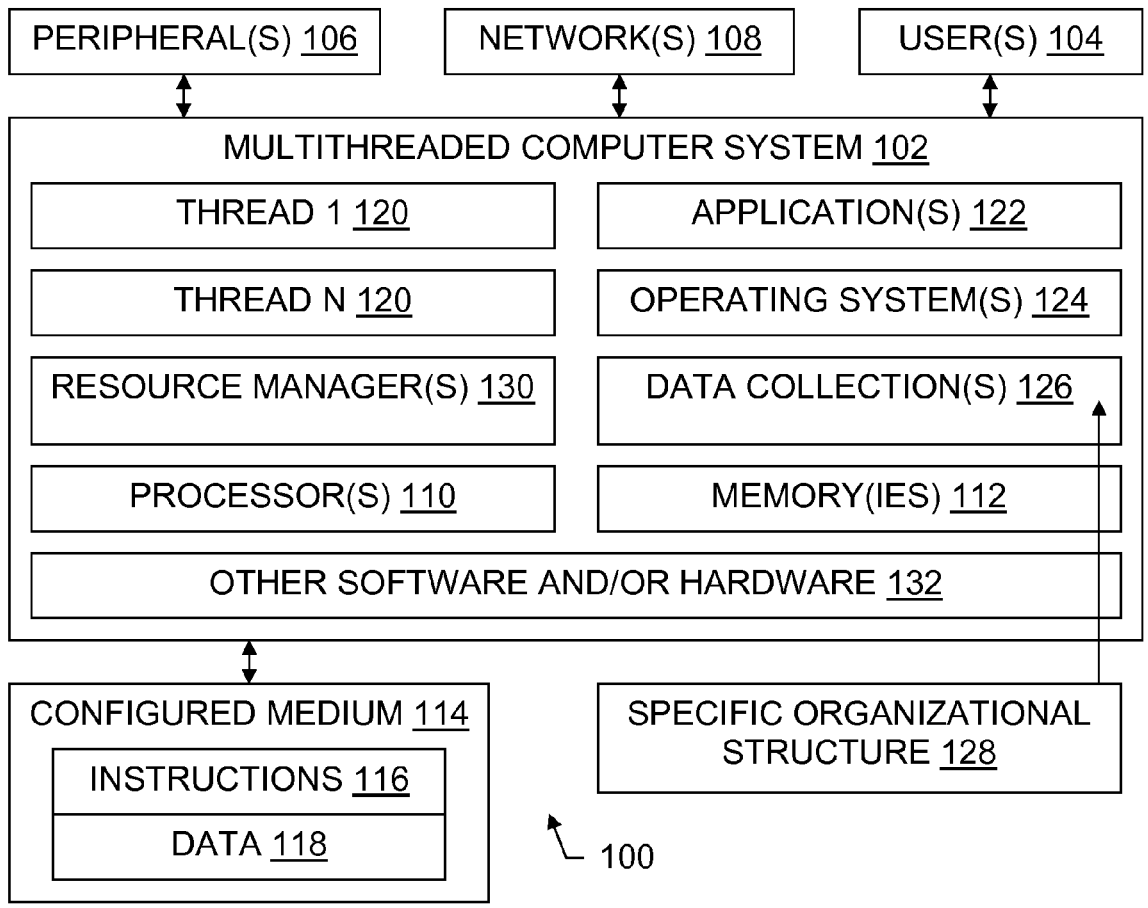
FIG. 1 is a block diagram illustrating a multithreaded computer system in an operating environment, and configured storage medium embodiments.

Blocking semantics have been tied to a particular data structure, for example a queue in the case of a blocking queue, or a stack in the case of a blocking stack. Blocking queues are discussed in the literature and found in widely used frameworks. Blocking queues support waiting for a queue to become non-empty during the execution of a dequeue operation. Some blocking queues optionally support waiting for a queue to become non-full during the execution of an enqueue operation (a.k.a. bounding). Type variations exist, such as specific types implementing blocking and bounding stacks, or blocking and bounding sets, for example. It is not unusual for a blocking and bounding data structure implementation to synchronize access in order to prevent multiple threads from modifying the data structure concurrently, although synchronization may be achieved at a considerable performance cost.

Blocking and bounding semantics could be more generally useful if they could be applied to arbitrary collections whose implementations are externally provided. For example, one might implement a priority queue without concern for bounding and blocking, and then apply bounding and blocking behavior to that priority queue in order to use the priority queue in a situation where blocking and bounding semantics are required. Similar use might be found for a sorted list with blocking-bounding, an unordered bag with blocking-bounding, and so on for other data collection organizational structures.

Some embodiments discussed herein provide blocking and bounding semantics on top of thread-safe data collections, in a manner agnostic to the type or implementation of the data structures actually used in the data collection. A defined membership interface identifies ways to modify a data collection, and a concrete implementation of the interface implements the relevant methods. Supported data structures do not need to be known a priori to the type implementing the blocking-bounding semantics, as the data collections need only implement a minimal interface that provides at least thread-safe add and remove operations. Moreover, an embodiment need only explicitly synchronize access to a counting semaphore representing the number of data elements available in the underlying data collection, and does not need to synchronize access to the data collection itself. The data collection implementation provides the thread-safety semantics internally and shielded through the interface, and it can do so in as efficient a manner as is possible for the relevant data structure. In the case of a stack, for example, advantage can be taken of well-known algorithms for lock-free stack implementations. Non-thread-safe collections can also be wrapped in a thread-safe wrapper that implements the membership interface, Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded computer system" is a computer system which supports multiple execution threads. The threads may run in parallel, in sequence, or in a combination of parallel execution (e.g., multiprocessing) and sequential execution (e.g., time-sliced).

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

As used herein, terms referring to data structures are only as specific as their express qualifiers. For example, without further qualification, the term "list" includes both linked lists and lists implemented using an array.

Whenever reference is made to a data collection or other data structure, it is understood that the data structure configures a computer-readable memory, as opposed to simply existing on paper, in a programmer's mind, or as a transitory signal on a wire, for example.

Operating Environments

With reference to FIG. 1, an operating environment 100 for an embodiment may include, for instance, a multithreaded computer system 102. Although a multithreaded computer system is presented here as an example, embodiments may also be provided using computer systems that are not multi-threaded. Likewise, some embodiments are configured for multiprocessing, while other embodiments are not. Human users 104 may interact with the multithreaded computer system 102 or with another computer system in an embodiment by using screens, keyboards, and other peripherals 106. Storage devices and/or networking devices may be considered peripheral equipment in some embodiments. Other computer systems (not shown), which may themselves be multi-threaded or not, and multiprocessing or not, may interact with the multithreaded computer system 102 or with another system embodiment using one or more network connections via network interface equipment, for example.

The multithreaded computer system 102 includes at least one logical processor 110 which executes one or more threads 120. Other computer systems embodiments will also contain at least one processor, but will not necessarily contain threads. The multithreaded computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the multithreaded computer system 102 when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The data 118 may include data structures, some of which may be organized in data collections 126 having a specific organizational structure 128. The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that threads 120, data 118, software, and other items shown in the Figures may reside partially or entirely within one or more memories 112, thereby configuring those memories.

In a given operating environment, the multithreaded computer system 102 or another computer system may run one or more applications 122, may run an operating system 124, and may use any network interface equipment, now known or hereafter formed. In particular, applications 122 may be embedded. Resource managers 130, such as memory allocation and garbage collection routines, handle managers, and the like, may be present. Other software and/or hardware 132 not expressly named above may also be present in a given configuration.

An operating environment may include one or more multithreaded computer systems or non-multithreaded computer systems. These computer systems may be clustered, client-server networked, and/or peer-to-peer networked. Some operating environments include a stand-alone (non-networked) computer system.

Some of the suitable operating environments for some embodiments include the Microsoft®.NET™ environment (marks of Microsoft Corporation). Some suitable operating environments include Java® environments (mark of Sun Microsystems, Inc.), and some include environments which utilize languages such as C++ or C# ("C-Sharp").

Systems

Referring now to FIGS. 1 through 8, some embodiments include a computer system configured with a membership interface 202, a membership implementation 204, and a blocking-bounding wrapper 206. Each of these components is discussed in greater detail below.

Some embodiments include a configured computer-readable storage medium 114, which is an example of a memory 112. Memory 112 may include disks (magnetic, optical, or otherwise), RAM, EEPROMS or other ROMs, and/or other configurable memory. A general-purpose memory 112, which may be removable or not, and may be volatile or not, can be configured into an embodiment using components such as a membership interface 202, a membership implementation 204, and a blocking-bounding wrapper 206, in the form of corresponding data 118 and instructions 116, read from a removable medium 114 and/or another source such as a network connection, to thereby form a configured medium in the form of configured memory 112 which is capable of causing a computer system to perform blocking-bounding wrapper placement and/or utilization steps and provide blocking-bounding semantics in a type-agnostic manner as disclosed herein. FIGS. 1 through 8 thus help illustrate configured storage media embodiments and method embodiments, as well as system embodiments.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Figure 2:
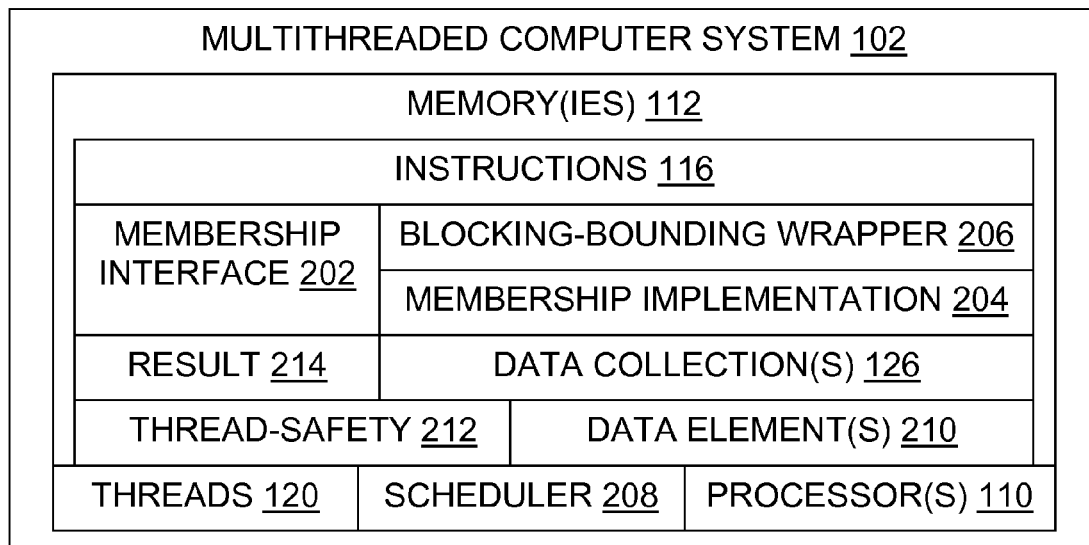
FIG. 2 is a block diagram further illustrating a multithreaded computer system configured with a membership interface, a membership implementation, a blocking-bounding wrapper, and at least one data collection.

As illustrated in FIG. 2, a multithreaded computer system 102 may be configured with a membership interface 202, a membership implementation 204, and a blocking-bounding wrapper 206. Also present in the illustrated configuration are threads 120, whose execution is scheduled at least in part by a thread scheduler 208. The threads 120 can use routines in the membership implementation to attempt to access individual data elements 210 of a given data collection 126. Mechanisms for thread-safety 212 are present, e.g., in the membership implementation 204, to help prevent inconsistencies caused by having two threads access a data collection at the same time. Suitable thread-safety mechanisms may include, for example, locks implementing mutual exclusion and/or atomic operations. Access attempts may add a data element 210 to a data collection 126, remove a data element 210 from a data collection 126, suspend execution of a thread 120, and/or fail. A result 214 returned by an access attempt may include a data element 210, a status code, or both.

With reference to FIGS. 3 through 8, an embodiment does not necessarily require a multithreaded computer system 102. Some embodiments use a computer system that is not multithreaded. Some embodiments include a single logical processor 110, and some include multiple logical processors. Some embodiments are multithreaded and configured to allow at least two threads to execute on different logical processors. Some are multithreaded running on a single processor. Of course, the components that are required in a given embodiment are controlled by the claims, not by the drawings.

Figure 3:
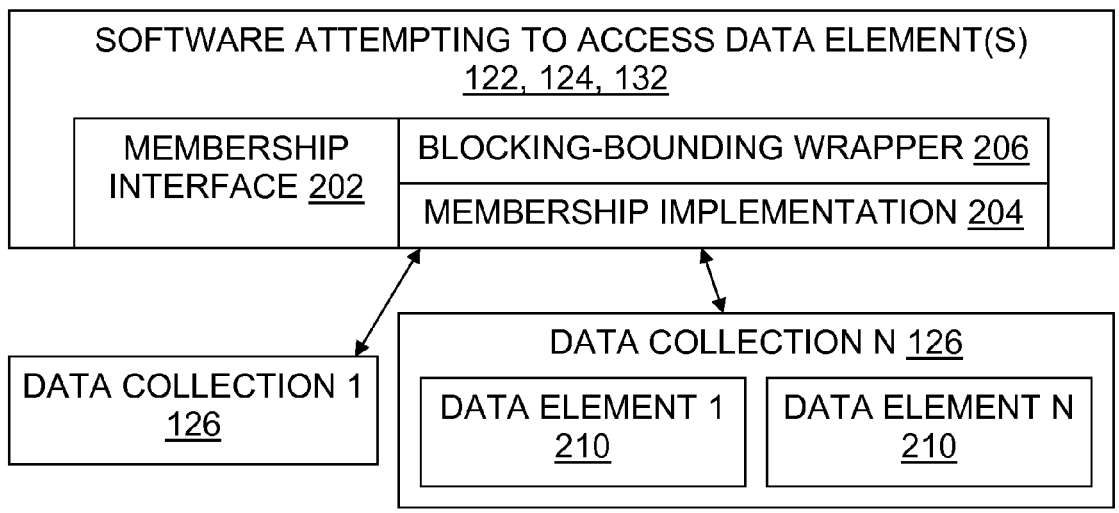
FIG. 3 is a block diagram illustrating a configuration which includes software using data collections, a membership interface, a membership implementation, a blocking-bounding wrapper, and multiple data collections.

As illustrated in FIG. 3, some embodiments include, or at least provide access to, a plurality of data collections 126. In some embodiments, all of the data collections 126 are of the same data element 210 type; in others, data elements 210 of different types are present. In some embodiments, all of the data collections 126 have the same organizational structure 128, e.g., they are all organized as stacks, or they are all organized as FIFO queues. In other embodiments, at least two different organizational structures 128 are present. In particular, and without limiting the foregoing, some embodiments include, or at least provide access to, multiple data collections 126 which have the same underlying data element 210 type but have different organizational structures 128. For example, an embodiment might provide uniform access to a stack of game_event elements in one data collection and a bag of game_event elements in another data collection.

As also illustrated by FIG. 3, the software which attempts to access the data elements 210 may be of various kinds. Aspects of an embodiment may be used, for example, to provide blocking-bounding data element access to applications 122, to operating systems 124, or to other software. In particular, aspects of an embodiment may be used to provide blocking-bounding access semantics for thread-safe operations on data collections for software that is running multiple threads.

Figure 4:
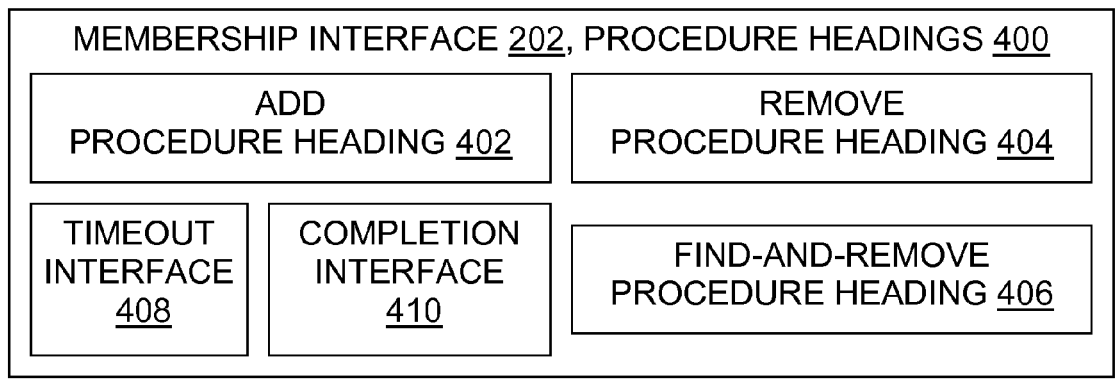
FIG. 4 is a block diagram further illustrating a membership interface.

As illustrated in FIG. 4, some embodiments of a membership interface include one or more "procedure headings". Procedure headings may be implemented as method signatures, type signatures, procedure specifications, method declarations, or the like. Procedure headings provide information such as the name of a function or other software routine, the parameters expected by the routine, and the value if any returned by the routine.

FIG. 4 shows three of the possible procedure headings 400 for a membership interface 202. An add procedure heading 402 defines an interface to one or more routines which attempt to add a data element 210 to a data collection 126. A remove procedure heading 404 defines an interface to one or more routines which attempt to remove a data element 210 from a data collection 126. A find-and-remove procedure heading 406 defines an interface to one or more routines which attempt to find a data element 210 meeting one or more specified criteria and then remove that data element from a data collection 126. A given membership interface 202 may include one or more such procedure headings.

Some embodiments of a membership interface 202 include a timeout interface 408. The timeout interface 408 may include a procedure heading 400 and/or other items such as variables. If an attempt to modify data collection membership using a routine invoked through a procedure heading 400 takes longer than a timeout value specified by the timeout interface 408, then the modification attempt is cut short. Data collection contents, and semaphores used to throttle that content, remain unchanged. A result 214 may be returned indicating that timeout occurred. In some embodiments, different timeout values (including no timeout) can be specified for different procedure headings 400.

Some embodiments of a membership interface 202 include a completion interface 410. The completion interface 410 may include a procedure heading 400 and/or other items such as flag variables. Using the completion interface 410, a given data collection 126, or a given set of data collections 126, can be marked as being completed. In some embodiments, the completion interface allows a data collection to be marked as permanently empty, indicating that no new data elements 210 will be added to a completed data collection 126, e.g., the add procedure heading 402 will never be called again for that data collection. As a result, any remaining remove operations waiting for data elements 210 that will never come can be woken; the data collection 126 is empty and will not receive any more data elements. Likewise, any future remove operations can be prevented from waiting for data elements that will never come. In some embodiments, the completion interface allows a data collection to be marked as permanently full, indicating that no new data elements 210 will be removed from a completed data collection 126, e.g., the remove procedure heading 404 and/or the find-and-remove procedure heading 406 will never be called again for that data collection. As a result, any remaining add operations waiting for available space that will never come can be woken; the data collection 126 is full. Likewise, any future add operations can be prevented from waiting.

Figure 5:
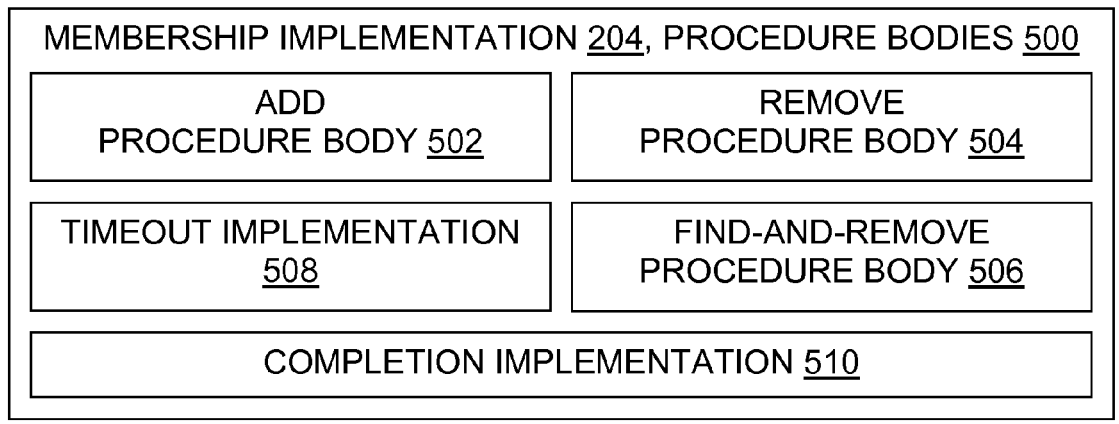
FIG. 5 is a block diagram further illustrating a membership implementation.

FIG. 5 shows some of the possible procedure bodies 500 of a membership implementation 204, which implement operations presented in the membership interface 202. A given membership interface 202 may have more than one corresponding membership implementation 204, because the organizational structures 128 of data collections 126 are unspecified in the membership interface 202 but specific in the routines of a membership implementation 204. An add procedure body 502 implements a routine which attempts to add a data element 210 to a data collection 126. A remove procedure body 504 implements a routine which attempts to remove a data element 210 from a data collection 126. A find-and-remove procedure body 506 implements a routine which attempts to find a data element 210 meeting one or more specified criteria and then remove that data element from a data collection 126. A timeout implementation 508 likewise implements the timeout interface 408, and a completion implementation 510 likewise implements the completion interface 410.

Figure 6:
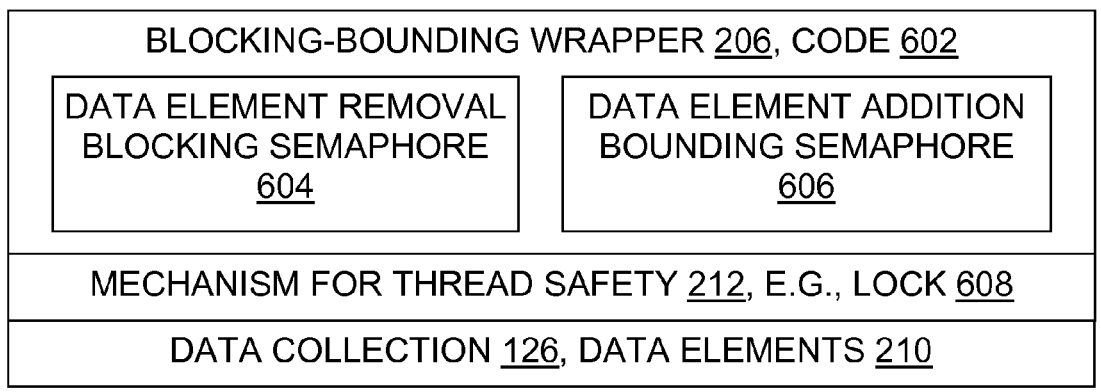
FIG. 6 is a block diagram further illustrating a blocking-bounding wrapper, a separate thread-safety mechanism, and a data collection.

FIG. 6 illustrates a blocking-bounding wrapper 206, which includes in some embodiments executable code 602 and semaphores 604, 606 to provide blocking-bounding semantics. A given embodiment may provide blocking semantics, bounding semantics, or both. In place of, or in addition to semaphores, a given embodiment may use a different throttling mechanism such as condition variables to provide blocking-bounding semantics. Attempts to access data elements 210 can be managed by the blocking-bounding wrapper 206 in conjunction with a mechanism for thread-safety 212, as suggested by FIG. 6. The lock 608 or other thread-safety mechanism 212 is not part of the blocking-bounding wrapper 206, but (if present) would be built into the membership implementation 204. The wrapper 206 relies on the thread-safety provided by the membership implementation and hence does not need a lock 608.

Non-thread-safe collections 126 can be wrapped in a simple thread-safe wrapper that implements the correct interface, e.g.:

```
class NonThreadSafeStack
{
    public void Push(T item) { ...}
    public T Pop( ) { ... }
}
class ThreadSafeStack : IConcurrentCollection
{
    private NonThreadSafeStack _stack;
    public ThreadSafeStack(
        NonThreadSafeStack stack) {
        _stack = stack;
    }
    public bool TryAdd(T item) {
        lock(_stack) _stack.Push(item);
        return true;
    }
    public bool TryRemove(out T item) {
        lock(_stack) item = _stack.Pop( );
        return true;
    }
    ...
}
```

Given a NonThreadSafeStack, one can still use it with BlockingCollection<T>, e.g.:

```
    private BlockingCollection<T> bc =
new BlockingCollection<T>(
    new ThreadSafeStack(
        new NonThreadSafeStack( )));
// etc.
```

A developer may wrap a non-thread-safe collection with a thread-safe collection in order to allow the blocking-bounding wrapper 206 to be used. If the general framework (e.g., Microsoft .NET framework, or a Java framework) in which this wrapper was being used provided an interface that represented non-thread-safe versions of relevant Add/Remove operations, then the blocking-bounding wrapper could itself be implemented to wrap a non-thread-safe collection provided to it with a thread-safe one, in which case the wrapper would internally be using its own lock to provide thread-safety.

A semaphore, such as semaphore 604 or semaphore 606, is similar to a critical region, at least with respect to threads, except that rather than allowing only one thread into a region at any one time, a semaphore allows up to N threads in that region at any one time. N could be one, in which case a semaphore could be used for mutual exclusion, but a semaphore does not necessarily need to be used for mutual exclusion.

A semaphore can be used in a blocking queue implementation, for example, to throttle the number of data elements that can be removed from a data collection, to support blocking on removals. Every time an element is added to the collection, the semaphore's count is increased. Every time an element is removed, the semaphore's count is decreased. If an attempt is ever made to decrease the semaphore's count, and the count is already zero, the operation will block until the semaphore's count enables an element to be removed, e.g. until another thread comes along and increments the count. One implementation might look like this:

```
        public void Add(T data)
    {
        lock (_queue) _queue.Enqueue(data);
        _semaphore.Release( );
    }
    public T Remove( )
    {
        _semaphore.WaitOne( );
        lock (_queue) return _queue.Dequeue( );
    }
```

In the foregoing example, the semaphore is used to throttle the removals, and the lock is used to ensure that multiple threads don't attempt to modify the (non-thread-safe) underlying collection (_queue) at the same time. Some embodiments allow an arbitrary thread-safe collection to be used instead, avoiding the inner lock, but the semaphore is still used for throttling.

As suggested by FIG. 6, the blocking-bounding wrapper 206 may itself be free of any mechanism for thread-safety 212 such as a lock 608, e.g., a critical section or a mutually exclusive region. That is, the throttling capability provided by the blocking-bounding wrapper 206 is distinct from the thread-safety mechanism. Indeed, as noted herein the blocking-bounding wrapper 206 may be employed in computer systems which are not multithreaded and therefore have no need for thread safety.

Figure 7:
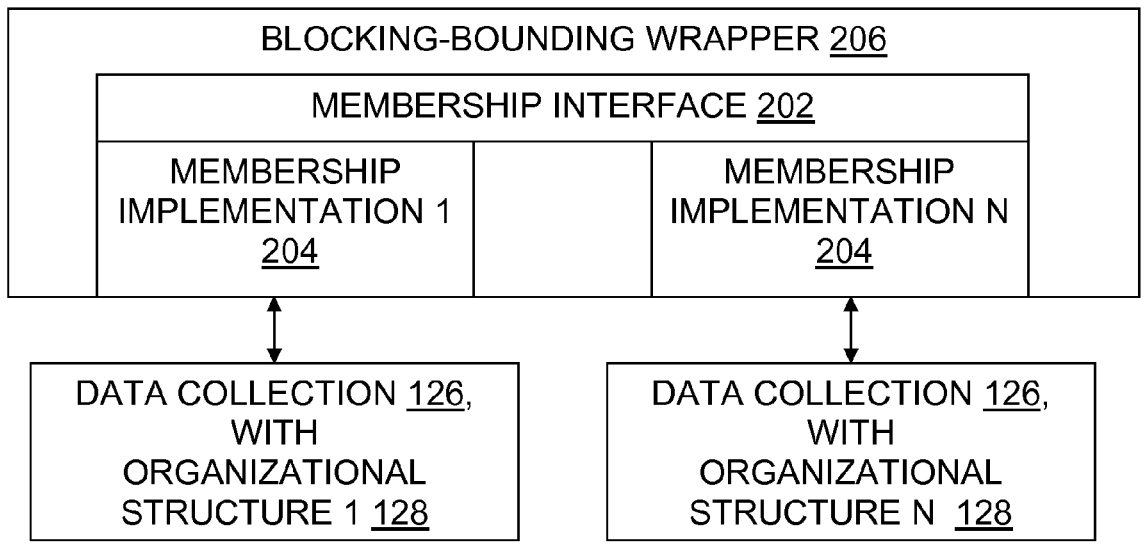
FIG. 7 is a block diagram illustrating a configuration which includes a membership interface, a membership implementation, a blocking-bounding wrapper, and multiple data collections which are heterogeneous in that they collectively have multiple organizational structures.

As illustrated in FIG. 7, a given membership interface 202 may have multiple corresponding membership implementations 204, for each of which a blocking-bounding wrapper 206 provides blocking-bounding semantics. Likewise, multiple data collections 126 may be present, having multiple respective organizational structures 128. It is possible to have one bounding-blocking wrapper 206 around multiple membership implementations 204 by placing those multiple implementations into a single consolidated implementation and then wrapping that consolidated implementation with the bounding-blocking wrapper. Alternately or in addition, an embodiment may have one bounding-blocking wrapper 206 per membership implementation 204. To operate on multiple instances, one operates on them at the level of the wrapper rather than at the level of the implementations.

Figure 8:
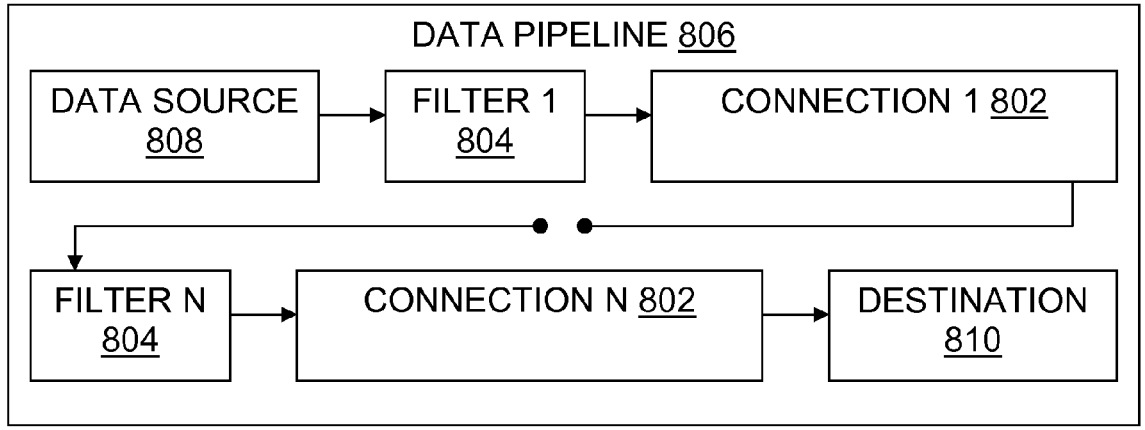
FIG. 8 is a block diagram illustrating blocking-bounding wrapped membership implementations in a data pipeline.

As illustrated in FIG. 8, connections 802 can be used to connect filters 804 in a data pipeline 806 from a data source 808 to a data destination 810. Each connection 802 includes a membership implementation 204 wrapped in a blocking-bounding wrapper 206. The same underlying data collection 126 is not necessarily used for each of the connections 802. A blocking stack could be used between two filters, while a blocking queue is used between two other filters, for example. Since the membership interface 202 for the connections 802 does not change, the filters 804 do not need a priori knowledge about the actual data structures used in data collections 126, and can each access the data elements 210 through the same membership interface 202.

One embodiment includes a multithreaded computer system 102, in which at least one memory 112 is configured with executable instructions 116, and at least one logical processor 110 is configured to execute at least a portion of the instructions to perform a thread-safe and blocking-bounding operation to change the number of member data elements 210 in a data collection 126. A membership interface 202 provides a common thread-safe container interface for accessing data collections. The membership interface 202 configures the memory. The membership interface 202 is designed to invoke a thread-safe operation to change the number of data elements 210 in a data collection 126, the data collection 126 having an organizational structure 128 which is unspecified in the membership interface 202.

In this embodiment, a membership implementation 204 which configures the memory 112 is associated with the membership interface 202. The membership implementation 204 includes instructions 116 which implement a thread-safe operation to change the number of data elements 210 in the data collection 126. The organizational structure 128 of the data collection 126 is specific in the membership implementation, e.g., the membership implementation add procedure body 502 is tailored to add a data element to a stack. In some embodiments, the membership implementation 204 gets associated with the membership interface 202 when a constructor is called.

A blocking-bounding wrapper 206 also configures the memory 112, and wraps the membership implementation 204, that is, supplements the membership implementation 204 by adding blocking-bounding semantics. The blocking-bounding wrapper 206 is configured to execute instructions 116 to perform at least one of the following blocking-bounding operations in response to an invocation of a procedure heading 400 of the membership interface 202: a blocking operation to be performed on an attempt to remove a data element 210 from the data collection 126 when the data collection lacks a data element available for removal, a bounding operation to be performed on an attempt to add a data element 210 to the data collection 126 when a resource (e.g., sufficient free space in memory 112) that is needed to add the data element 210 to the data collection 126 is lacking. In some embodiments, the blocking-bounding wrapper 206 itself includes a throttling semaphore, such as semaphore 604 and/or semaphore 606, but contains no thread-safety lock 608 or other thread-safety mechanism.

In some embodiments, the membership interface 202 includes an add procedure heading 402 for invoking a thread-safe data collection add operation, namely, a thread-safe operation which will accept a data element 210, attempt to add the data element to the data collection 126, and return a status indicating a result 214 of the add attempt. In some embodiments, the membership interface 202 includes a remove procedure heading 404 for invoking a thread-safe data collection remove operation, namely, a thread-safe operation which will attempt to remove a data element 210 from the data collection 126, and return at least an indication of a result 214 of the remove attempt, such as a status code and/or the removed data element 210. In some embodiments, the membership interface 202 includes a find-and-remove procedure heading 406 for invoking a thread-safe data collection find-and-remove operation, namely, a thread-safe operation which will attempt to find in the data collection 126 a data element 210 which matches at least one specified data element criterion (such as matching a key value or a specified value range), will attempt to remove such a data element if found, and will return at least an indication of a result 214 of the find-and-remove attempt.

In some embodiments, the membership interface 202 includes a membership change timeout value which forms at least part of a timeout interface 408. A blocking-bounding operation times out and returns a failure indication as a result 214 if the time spent attempting to change a data collection's membership (e.g., by adding a data element 210) exceeds the timeout value.

In some embodiments, the membership interface 202 includes a completion value which forms at least part of a completion interface 410. The system includes instructions 116 which are designed to note that a data collection 126 is permanently empty, and instructions 116 designed to then promptly wake and give a failure indication to all threads 120 which would otherwise remain permanently blocked while attempting to remove a data element 210 from the permanently empty data collection 126.

In some embodiments, a system includes multiple data collections 126 configuring memory 112. The data collections 126 may collectively exhibit at least two different organizational structures 128 (e.g., stack and queue), in which event the executable instructions 116 may include instructions in a membership implementation 204 and a blocking-bounding wrapper 206 which are designed to attempt to add a data element 210 to any one of the data collections 126 using a thread-safe bounding operation. Some similar embodiments include instructions 116 designed to attempt to remove a data element 210 from any one of the data collections 126 using a thread-safe blocking operation.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples.

Methods Overview

Figure 9:
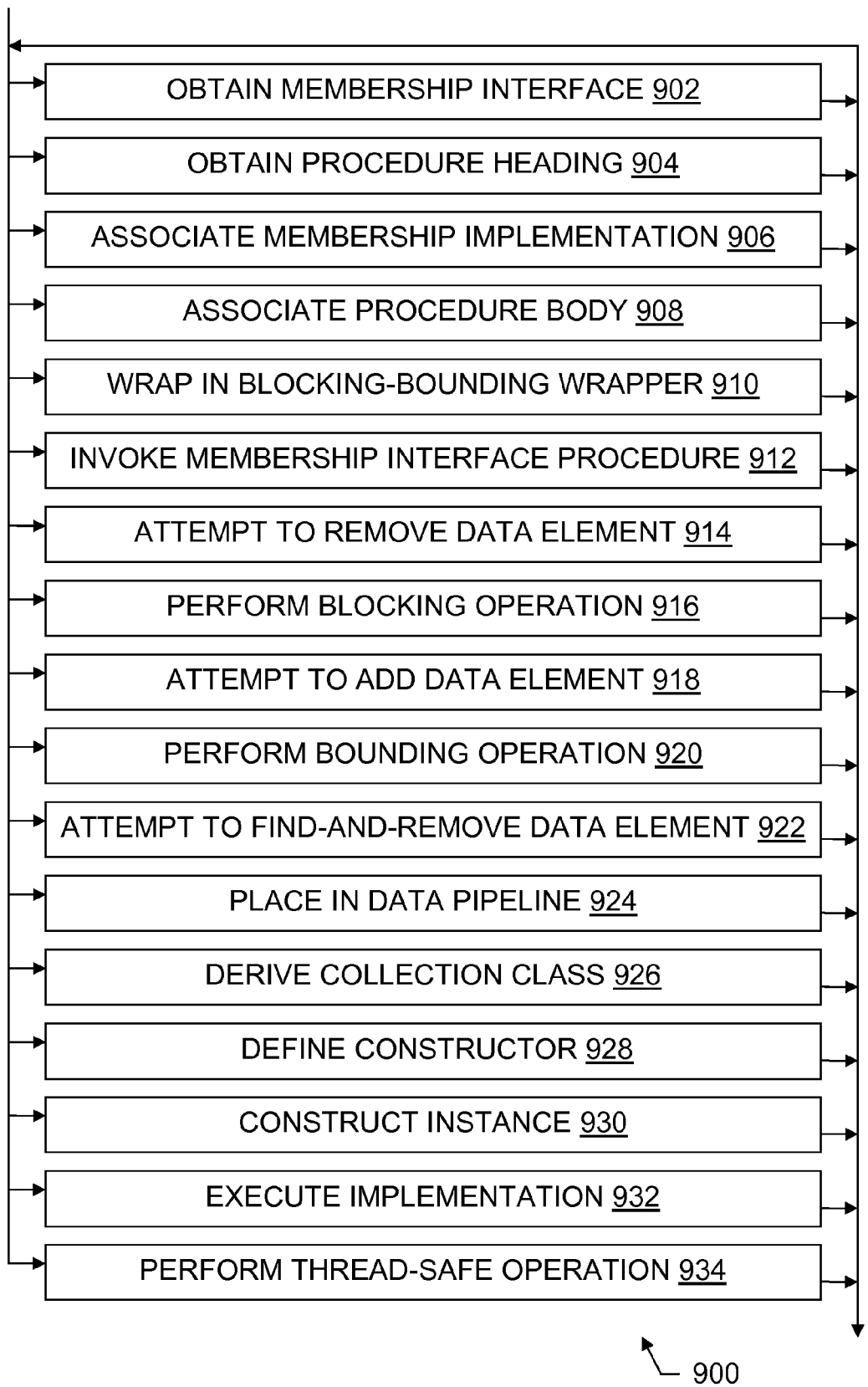
FIG. 9 is a flow chart illustrating steps of some method and configured storage medium embodiments.

FIG. 9 illustrates some method embodiments in a flowchart 900. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 900 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a membership interface obtaining step 902, a software developer (or code acting on behalf of a developer) obtains a membership interface 202. Obtaining step 902 may be accomplished by including a file containing code which implements the membership interface 202, by linking such a file, by loading such a file, or by any mechanism for bringing software capabilities into an environment or into a particular program. A developer is understood to be a particular type of user 104; end-users are also considered users 104.

During a procedure heading obtaining step 904, a developer or an environment obtains a procedure heading 400. Procedure heading obtaining step 904 may coincide with interface obtaining step 902, but it will also be appreciated that by obtaining 902 a membership interface 202 one may in some cases thereby obtain 904 several procedure headings 400.

During a membership implementation associating step 906, a membership implementation 204 is associated with a membership interface 202. Associating step 906 may be accomplished by instantiating a class, by linking, by setting address pointers for routines, or by any other mechanism for associating a procedure body 500 with a procedure heading 400 so that a call to the procedure heading passes control (and often also parameters) to the procedure body.

During a procedure body associating step 908, a procedure body 500 is associated with a procedure heading 400. A given procedure heading 400 may be associated 908 with different procedure bodies 500 at different locations in a system. Procedure body associating step 908 may coincide with implementation associating step 906, but it will also be appreciated that by associating 906 a membership implementation 204 one may in some cases thereby associate 908 several procedure bodies 500.

During a wrapping step 910, a membership implementation 204 is wrapped with a blocking-bounding wrapper 206. Wrapping step 910 may be accomplished by instantiation or any mechanism which places a membership implementation 204 procedure body 500 in a call chain with a blocking or bounding routine of the wrapper 206.

During a membership interface procedure invoking step 912, a procedure having a procedure heading 400 in a membership interface 202 is invoked. Invoking step 912 may be accomplished using mechanisms that pass control to a routine, and may include passing parameters into the routine.

During a remove attempting step 914, which may result from an invoking step 912, an attempt is made to remove a data element 210 from a data collection 126. Which element is removed depends on the implementation and the current contents of the data collection. If a particular element is to be removed, then a find-and-remove operation would be performed instead of a remove operation. The remove attempting step 914 returns the removed element if one could be removed, and may return a status code. The attempting step 914 may include calling a membership implementation 204 procedure body 500, such as a remove procedure body 504 or a find-and-remove procedure body 506. Removing 914 from a data collection doesn't necessarily block; execution only blocks if an element isn't available to be removed and resumes after an element is available to be removed.

During a blocking step 916, a blocking operation is performed by code 602 of a blocking-bounding wrapper 206. The blocking operation suspends execution of the step 914 removal attempt routine, for example, if no data element 210 is available for removal from the data collection 126, e.g., because the data collection 126 is empty.

During an add attempting step 918, which may result from an invoking step 912, an attempt is made to add a data element 210 to a data collection 126. The attempting step 914 may include calling a membership implementation 204 procedure body 500, such as an add procedure body 502. Adding 918 does not always block execution. Execution blocks until there is room in the collection to add the item; if there is already room, no blocking is necessary. In some embodiments, a single data element is added to one of an arbitrary number of collections which are associated with the membership interface, as opposed to a copy of the data element being added to each data collection.

During a bounding step 920, a bounding operation is performed by code 602 of a blocking-bounding wrapper 206. The bounding operation suspends execution of the step 918 add attempt routine, for example, if no memory space large enough to hold a data element 210 is available in the data collection 126.

During a find-and-remove attempting step 922, which may result from an invoking step 912, an attempt is made to find a satisfactory data element 210 in a data collection 126, and to remove it if it was found. Zero, one, or more data elements 210 may be satisfactory, depending on the search criteria, the data elements present, and the coding of the embodiment in question. The attempting step 922 may include calling a membership implementation 204 procedure body 500, such as a find-and-remove procedure body 506.

During a placing step 924, a connection 802 is placed in a data pipeline 806, using a script, pipe, I/O redirection, and/or other mechanism for building a data pipeline.

During a deriving step 926, a data collection class instance is derived, using mechanisms provided in programming languages such as C-Sharp or Java, informed by the teachings herein to help provide blocking-bounding semantics and/or blocking-bounding thread-safe operations.

During a constructor defining step 928, a class instance constructor is defined, using mechanisms provided in programming languages such as C-Sharp or Java, informed by the teachings herein to help provide blocking-bounding semantics and/or blocking-bounding thread-safe operations.

During an instance constructing step 930, a class instance is constructed, using mechanisms provided in programming languages such as C-Sharp or Java, informed by the teachings herein to help provide blocking-bounding semantics and/or blocking-bounding thread-safe operations.

During an implementation executing step 932, code of a membership implementation 204 is executed in a system as a result of an invoking step 912.

During a thread-safe operation performing step 934, a thread-safe operation is performed on a data collection 126, e.g., using thread-safe versions of one or more membership implementation procedure bodies 500.

Example Code

Bearing in mind the information provided thus far about systems, methods, and operating environments, program code for an example embodiment is discussed below. Embodiments are not limited to the program code provided here, and a given embodiment may include additional program code, different program code, code written in a different programming language, and/or otherwise depart from the examples provided. Discussion of method embodiments continues after example code, with references back to the example code.

Code in an example helps provide blocking and bounding support for arbitrary data collections 126 that implement a membership interface 202. In the example, the membership interface 202 supports at least an add operation that accepts the data element 210 to be added to the data collection 126 and returns a result 214 indicating whether the add was successful. This membership interface 202 also supports a remove operation that attempts to remove a data element 210 from the data collection 126 and returns a result 214 indicating whether the operation was successful as well as the removed data element if it was successful. Both of these operations are assumed in this example to be thread-safe, meaning they support the data collection 126 being accessed concurrently by multiple threads 120 using this interface. Here is an example of such a membership interface 202 implemented in C-Sharp:

```
public interface IConcurrentCollection<T>
{
    Boolean TryAdd(T item);
    Boolean TryRemove(out T item);
}
```

That is, "IConcurrentCollection<T>.TryAdd(T item)" is an example of a procedure heading 400, and in particular is an example of an add procedure heading 402. The parameter T is an example of a data element 210; the data type "item" is some type used for data elements 210. In this code, "IConcurrentCollection<T>.TryRemove(out T item)" is an example of a procedure heading 400, and in particular is an example of remove procedure heading 404.

The specifics of how a data collection 126 implements an interface 202 and the mechanism that provides thread-safety guarantees are left to the implementer of the data collection. As an example, a compliant thread-safe stack could be implemented as follows within a membership implementation 204, again using C-Sharp:

```
public class ThreadSafeStack<T> :
IConcurrentCollection<T>
{
    public bool TryAdd(T item) { Push(item); return true; }
    public bool TryRemove(out T item) { return TryPop(out item); }
    private void Push(T item) { lock(_stack)
_stack.Push(item); }
    private bool TryPop(out T item)
    {
        item = default(T);
        lock(_stack)
        {
            if (_stack.Count > 0)
            {
                item = _stack.Pop( );
                return true;
            }
        }
        return false;
    }
    private Stack<T> _stack = new Stack<T>( );
}
```

That is, the routine ThreadSafeStack<T>.TryAdd( ), including the code for Push( ), is an example of a procedure body 500, and in particular is an example of an add procedure body 502. Likewise, the routine ThreadSafeStack<T>.TryRemove( ), including the code for TryPop( ), is an example of a remove procedure body 504.

A more efficient implementation of ThreadSafeStack<T> could use an internal linked list of nodes, each of which contains one data element, and interlocked operations for manipulating those nodes to ensure thread-safety, thus avoiding the need for expensive locks. Regardless, this is just one example of an implementation of IConcurrentCollection<T>. The implementation of the data collection is unspecified in IConcurrentCollection<T>; the implementation merely needs to be compliant with the interface procedure headings 400, and with the other membership interface components, e.g., the timeout interface 408 and the completion interface 410, if they are present. The data collection 126 may have an organizational structure 128 in the form of a set, a queue, a priority queue, a sorted list, or any other form in which blocking and bounding semantics could be relevant.

One example of a type that supports a blocking-bounding wrapper 206 is a type called BlockingCollection<T>, discussed below. BlockingCollection<T> can provide the blocking and bounding behavior around an instance of a concurrent collection interface. The BlockingCollection<T> type is initialized with such an instance, with BlockingCollection<T> knowing only that the instance implements the membership interface 202 and not needing any more information about the contents of the instance.

The BlockingCollection<T> type can also support initialization from a non-empty data collection 126, in which case the interface 202 could also support a mechanism such as a count procedure heading 400 for retrieving the count of data elements 210 in the data collection 126. Such a count property could be queried at initialization time. The count property should stay in sync with the TryAdd/TryRemove methods, such that successful calls to TryAdd( ) result in the count being incremented by 1, successful calls to TryRemove( ) result in the count being decremented by 1, and calls that do not change the number of data elements in the data collection also do not change the count. Note that this method for construction facilitates creation of concrete types tied to a specific backing store. For example, we could create a BlockingStack<T> in C-Sharp as follows:

```
public class BlockingStack<T> :
BlockingCollection<T>
{
    public BlockingStack( ) : base(new
ThreadSafeStack<T>( )) { }
}
```

As suggested in the foregoing code, one method embodiment includes deriving 926 a collection class such as BlockingStack<T> from a blocking-bounding class such as BlockingCollection<T> which provides the blocking-bounding wrapper 206. The method also includes defining 928 a constructor for the collection class as an instance of a membership implementation 204 class, such as ThreadSafeStack<T>. The membership implementation 204 class provides a procedure body 500, such as Push( ) or TryPop( ), that implements a thread-safe operation to change the number of data elements 210 in the data collection 126.

Deriving 926 a class and defining 928 a constructor may be the most straightforward approach in many cases, and also supports heterogeneous pipelines and the like. However there are other approaches. For example, one embodiment might wrap BlockingCollection<T> rather than deriving from it, e.g.:

```
public class BlockingQueue<T>
{
    private BlockingCollection<T> _bc =
        new BlockingCollection<T>(
            new ConcurrentQueue<T>( ));
    public void Enqueue(T item)
    {
        _bc.Add(item);
    }
    public T Dequeue( )
    {
        return _bc.Remove( );
    }
}
```

As another example, assume that when creating an instance of BlockingCollection<T> a developer passes to the BlockingCollection the underlying thread-safe collection to be used, e.g.:

```
var bc = new BlockingCollection<int>(
    new ThreadSafeStack<int>( ));
```

The foregoing code creates a new instance of a ThreadSafeStack of integers, and then immediately wraps it in a BlockingCollection to provide the bounding and blocking Add/Remove semantics on top of the stack's non-blocking Push/TryPop capabilities. A slightly simpler approach can also be taken. Rather than having a developer that wants a blocking-bounding stack create the blocking collection and create the thread-safe stack, an embodiment can create a new type, along the lines of the following example:

```
class BlockingStack<T> : BlockingCollection<T>
{
    public BlockingStack( ) :
        base(new ThreadSafeStack<T>( )) { }
}
```

Now instead of having to write:

```
var bc = new BlockingCollection<int>(
    new ThreadSafeStack<int>( ));
``` the developer can write:
var bc=new BlockingStack<int>( );

Inside the code of a blocking-bounding wrapper 206 such as BlockingCollection<T>, two semaphores may be used. One semaphore 604 represents the count of data elements 210 in the data collection 126 available for removal (for blocking). Another semaphore 606 represents the amount of unallocated memory space available for adding (for bounding).

Figure 10:
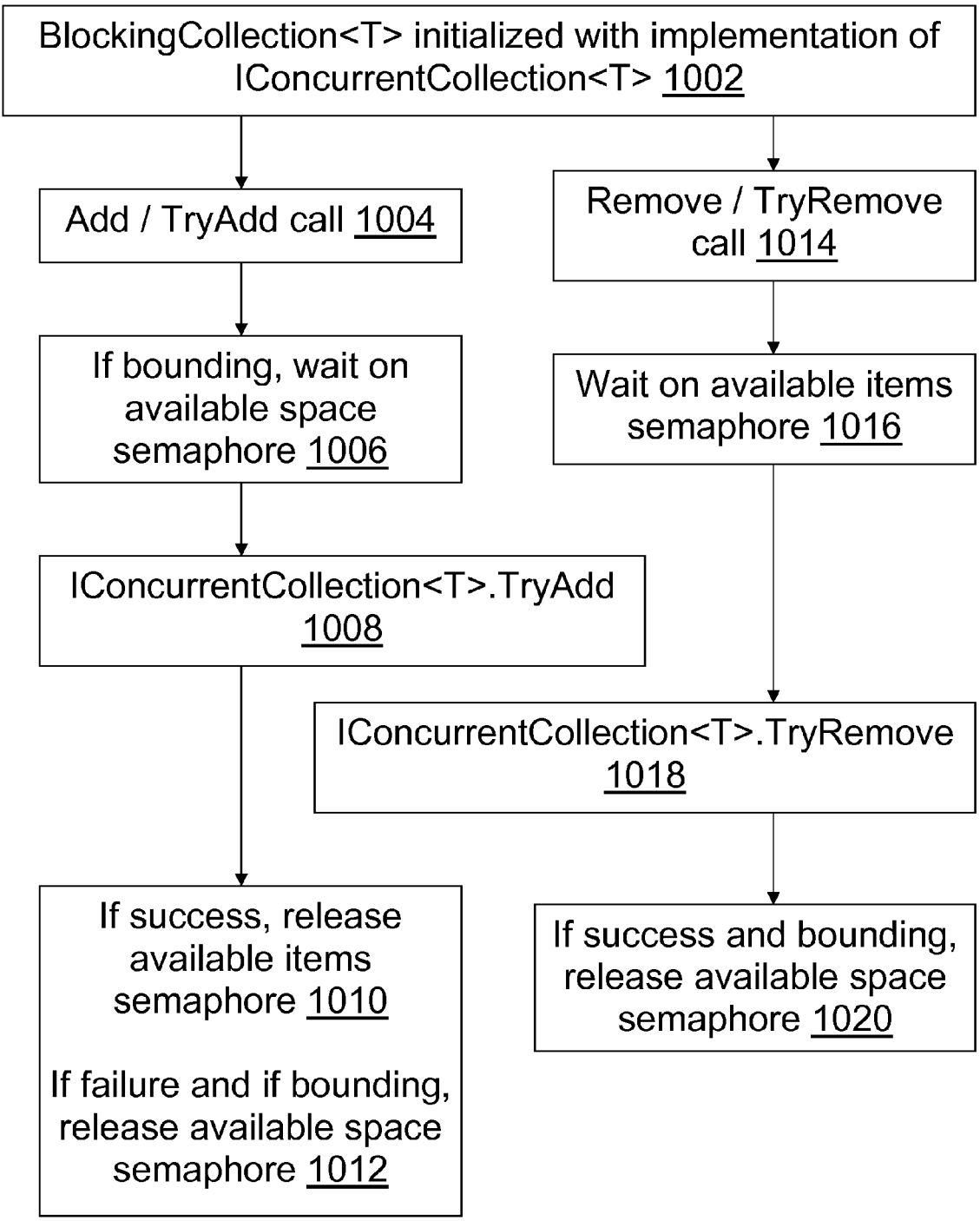
FIG. 10 is a flow chart further illustrating steps of some method and configured storage medium embodiments, using a specific C-Sharp program example.

Reference is now made to FIG. 10 as we continue discussing the BlockingCollection<T> example. During an initialization step 1002, if non-empty data collections 126 are supported, the BlockingCollection<T> code queries the provided data collection for its count of items, and uses that count to initialize the available items semaphore 604 to that value; otherwise, the available items semaphore 604 is initialized to a current count of zero. If bounding is being enforced, the available space semaphore 606 is initialized to the bounding count; if bounding is not being enforced, a compliant implementation has several options, such as to initialize the available space semaphore 606 to a predetermined maximum (e.g. Int32.MaxValue), or to not initialize the semaphore 606 at all and then ignore it for all relevant operations.

An add operation on the BlockingCollection<T> can be accomplished as follows. An add procedure heading 402 is invoked 912, for instance, leading to execution 1004 of an Add/TryAdd call. During a semaphore usage step 1006, if bounding is being enforced then execution waits on the available space semaphore 606. Then the data element addition is attempted, using the underlying interface's add operation 1008. If the add succeeds, the code releases 1010 the available items semaphore 604. If the add does not succeed and if bounding is being enforced, the code releases 1012 the available space semaphore 606.

Similarly, a remove operation on the BlockingCollection<T> can be accomplished as follows. A remove procedure heading 404 is invoked 912, for instance, leading to execution 1014 of a Remove/TryRemove call. During a semaphore usage step 1016, execution waits for the available items semaphore 604. Then the data element removal is attempted, using the underlying interface's remove operation 1018. If the remove succeeds, the code releases 1020 the available space semaphore 606. If the remove does not succeed, the available items semaphore 604 does not need to be released, as the removal failure indicates that there are no data elements available.

Note that no locks are explicitly taken in these operations. The semaphore implementation may well use a lock internally, and the collection implementation may use a lock internally, but the present approach is also useful with data collection implementations that do not use locks and that are instead implemented with lock-free algorithms. Accordingly, an embodiment can provide an efficient implementation of the blocking and bounding semantics. Nonetheless, in some embodiments locks are used to provide thread-safety.

Lock-freedom is a property of some embodiments, in which the only waits happen as a result of the container (data collection 126) being empty. With use of a lock, by contrast, waiting is introduced as a result of multiple threads trying to take from the same container at once, for example. In some embodiments, two threads serialize simple atomic increments/decrements, and so long as there are sufficient items in the container, they can both proceed w/out needing to acquire higher level software locks.

In addition to these basic add/remove operations, the BlockingCollection<T> supports a variety of options and additional operations.

For example, timeouts discussed in connection with FIGS. 4 and 5 can be present on add/remove. If part of either the add or remove operation exceeds a predetermined time limit, the relevant semaphores can remain unmodified and the rest of the operation can be abandoned.

As another example, completion as discussed in connection with FIGS. 4 and 5 can be present. The entire BlockingCollection<T> can be marked as being completed and permanently empty, meaning that a user of the instance is acknowledging that no new data elements will be added (i.e. add will never be called again). The type then supports waking up any remove operations waiting when the collection becomes empty if it isn't already empty and prevents any future remove operations from waiting. In some embodiments, after a data collection is marked complete no additional adds are permitted. All waits are awoken, and those that don't race to drain the container data collection, if any, will return an error, because the data collection has become empty permanently; no new items are expected to arrive. In some embodiments, a data collection can similarly be marked complete and permanently full.

As a further example, add/remove operations may be performed across multiple BlockingCollection<T> instances. A single data element 210 may be added to any one of an arbitrary number of data collections 126, or a single data element may be removed from any one of an arbitrary number of data collections, using, for example, exposed BlockingCollection<T>.TryAddAny and Blockingcollection<T>.TryRemoveAny static methods. For an add operation, this can be achieved by doing a non-decrementing wait on any of the available space semaphores from all of the data collections to be available, and attempting a non-blocking add operation on that BlockingCollection<T>; if the add fails, the process can be repeated until one succeeds or until a timeout is reached. A similar process is supported for removal. Since BlockingCollection<T> can be backed by arbitrary data collections, this supports add/remove across heterogeneous data structures, such as data collections 126 having different organizational structures 128.

In some embodiments, TryAddAny/TryRemoveAny procedures support adds/removes of a single element to/from one of any number of blocking-bounding wrappers. In some embodiments, procedures are provided that support adding a data element to each collection in a group of collections, or removing an element from each of the collections in the group. For example, an embodiment could provide:

```
public bool TryRemoveAny(
    BlockingCollection [ ] collections,
    out T item);
public bool TryRemoveAll(
    BlockingCollection [ ] collections,
    out T [ ] items);
```

Rather than getting back a single instance, a caller would get back an array of instances containing one item from each data collection. Other variations on add/remove are also possible. For example, an embodiment might not be limited to removing one item at a time, but might provide instead a method:

public T [ ] Remove (count);

That is, a caller would specify the number of data elements to be removed as the count parameter, and execution would block until that number of data elements can be removed from the collection, at which point the requested data elements would be returned in the array. For efficiency reasons, this could require changes to the underlying IConcurrentCollection to also allow a number of data elements to be specified in overloads of TryAdd/TryRemove. Multiple item removal could also be implemented just in the wrapper, possibly with different semantics.

Another example of added functionality involves pipelining. BlockingCollection<T> can be used for connecting filters 804 in a pipeline 806, and the same underlying data store doesn't need to be used for each of the connections 802. A blocking stack could be used between filter one and filter two, while a blocking collection could be used between filter two and filter three. Since the interface does not change, the filters do not need a priori knowledge about the actual data structure backing the BlockingCollection<T>, and can use it through the same interface exposed from BlockingCollection<T>.

In some cases, BlockingCollection<T> is what adds the blocking and bounding semantics. IConcurrentCollection<T> is what gets the blocking and bounding semantics added on to it. However, a BlockingCollection<T> can itself be an IConcurrentCollection<T>. An IConcurrentCollection<T> is something that exposes thread-safe TryAdd and TryRemove methods. The actual implementation of those TryAdd and TryRemove methods is irrelevant, in the sense that the organizational structure 128 of the data collection 126 need not be specified in the interface 202. IConcurrentCollection<T> could be a stack, in which case TryAdd is really a thread-safe push operation and TryRemove is really a thread-safe pop operation. Or IConcurrentCollection<T> could be a queue, in which case TryAdd is really a thread-safe enqueue operation and TryRemove is really a thread-safe dequeue operation, and so on. In some scenarios a developer may want an IConcurrentCollection<T> and not care about the actual implementation details, e.g. whether a stack or a queue or something else is used to organize the data elements in the data collection. The developer merely wants assurance that the implementation 204 provides thread-safe TryAdd/TryRemove methods. Now, assume BlockingCollection<T> wraps an IConcurrentCollection<T> and provides its own TryAdd/TryRemove methods that add bounding and blocking semantics. Because BlockingCollection<T> has thread-safe TryAdd/TryRemove methods, it meets the criteria to itself be an IConcurrentCollection<T>, in addition to wrapping an IConcurrentCollection<T>. In object-oriented terms, a BlockingCollection<T> both has-a and is-a IConcurrentCollection<T>.

Methods Continued

Discussion of method embodiments now continues, with references back to the example code. Some embodiments provide a method which may be used by a software developer to wrap a thread-safe data collection with blocking-bounding semantics.

The method includes obtaining 902 a membership interface 202, thereby obtaining 904 procedure headings 400 such as IConcurrentCollection<T>.TryAdd(T item) and/or IConcurrentCollection<T>.TryRemove(out T item). The membership interface 202 provides at least one procedure heading 400 for invoking 912 a membership interface procedure to perform a thread-safe operation to change the number of data elements 210 in a data collection 126. The data collection 126 has an organizational structure 128 (stack, queue, etc.) which is unspecified in the procedure heading.

The method also includes associating 906 a membership implementation 204, such as routines ThreadSafeStack<T>.Push( ) and ThreadSafeStack<T>.TryPop( ), with the membership interface 202. The method thereby associates 908 at least one procedure body 500 which implements a thread-safe operation to change the number of data elements 210 in the data collection 126. The organizational structure 128 of the data collection 126 is specific in the membership implementation 204, as illustrated in the code herein, for example.

The method also includes wrapping 910 the membership interface 202 and the membership implementation 204 in a blocking-bounding wrapper 206, such as BlockingCollection<T>. The blocking-bounding wrapper 206 performs at least one of the following in response to an invocation 912 of a membership interface procedure: a blocking operation which is performed on an attempt to remove a data element 210 from the data collection 126 when the data collection lacks a data element available for removal, a bounding operation which is performed on an attempt to add a data element 210 to the data collection 126 when a resource, such as sufficient free memory, that is needed to add the data element is lacking.

Some methods further include associating 906 a second membership implementation 204 with the membership interface 202, and wrapping 910 the second membership implementation in the blocking-bounding wrapper 206. For example, one method supports calling TryRemoveAny( ) for either of two data collections 126. In some embodiments, the two membership implementations wrapped in the blocking-bounding wrapper collectively implement thread-safe operations to change the number of data elements 210 in two data collections 126 which have different organizational structures 128 from one another. The two data collections could have different collection types, such as a stack and a queue, for example, while the underlying types for the data elements 210 in the collections 126 are same, e.g., stack of album_info, queue of album_info.

Some methods further include wrapping 910 a second membership implementation 204 in a second instance of the blocking-bounding wrapper 206, and placing the two wrapped membership implementations in a data pipeline 806.

Some methods include executing 932 a blocking-bounding wrapped membership implementation in a parallel processing environment, such as the Microsoft TPL environment, the Microsoft PLINQ environment, or another parallel processing environment. Microsoft, TPL, and PLINQ are marks of Microsoft Corporation. Other methods execute in an environment that is not configured for parallel processing.

Configured Media

Some embodiments provide a storage medium configured with computer data and computer instructions, such as data 118 and instructions 116, for performing a method of providing blocking-bounding semantics as discussed above. The storage medium which is configured may be a memory 112, for example, and in particular may be a removable storage medium 114 such as a CD, DVD, or flash memory.

The method characterized by the configured medium may be, in some embodiments for example, a method for blocking-bounding data collection access, including the step of associating 906 a membership implementation 204 with a membership interface 202, the membership implementation designed to attempt to add data elements 210 to a data collection 126 and to attempt to remove data elements from the data collection, the data collection having an organizational structure 128 that is specific in the membership implementation and unspecified in the membership interface. The method of these embodiments further includes wrapping 910 the membership interface and the membership implementation in a blocking-bounding wrapper 206, namely, a wrapper which performs at least one of the following in response to invocation 912 of a membership interface procedure: a blocking operation which is performed on an attempt to remove a data element from the data collection when the data collection lacks a data element available for removal, a bounding operation which is performed on an attempt to add a data element to the data collection when a resource needed to add the data element is lacking. Note that thread-safety is optional in these embodiments. Also, the software used in these embodiments is not necessarily written in a language that uses class inheritance. In some embodiments, however, the method includes executing instructions that derive 926 a class and executing instructions that construct 930 an instance of a class, as suggested by the code example above.

In some embodiments, the membership implementation 204 executes at least some of the computer instructions to perform 934 a thread-safe operation to change the number of data elements 210 in the data collection 126. For example, wherein the computer instructions may perform 934 at least one of the following: a thread-safe operation to attempt to add a data element to exactly one data collection in a heterogeneous group of data collections, that is, a group of data collections which do not all have the same organizational structure; a thread-safe operation to attempt to remove a data element from exactly one data collection in a heterogeneous group of data collections; a thread-safe operation to attempt to find and then remove a data element from a heterogeneous group of data collections.

In some embodiments, the method executes instructions that place, into a data pipeline 806, multiple connections 802 in the form of wrapped membership implementations, and does so for accessing data collections 126 which have different organizational structures 128.

More generally, any of the method steps illustrated in FIG. 9 or 10, or otherwise taught herein, may be used to help configure a storage medium to thereby form a configured medium embodiment.

CONCLUSION

As described herein, some embodiments provide an interface 202 representing a minimal set of thread-safe operations necessary to support concurrent adds and removals from a data collection 126. Some embodiments include blocking and bounding semantics (for additions and removals) provided as a wrapper 206 for an instance of an implementation 204 of this minimal interface 202. Some embodiments support adding and removing elements 210 to and from any one of an arbitrary number of these blocking-bounding collections 126, which can be heterogeneous with respect to the underlying data organization structure 128, e.g., one can TryAddAny( ) with a blocking stack, a blocking queue, and a blocking bag. Some embodiments support pipelines 806, where the blocking collection 126 used for coordination between filters 804 in the pipeline can be heterogeneous. Some embodiments include a common thread-safe container interface 202. In some, a new container in the form of a wrapped implementation 204 uses objects implementing this interface to manage data elements 210 in container storage. This new container offers blocking (suspending execution when empty) and bounding (suspending when full), although the underlying storage container needn't know anything about blocking or bounding. A developer configures the new container when constructing it, by providing a concrete object of the kind to be used for storage, in the form of an implementation 204. Other aspects of a given embodiment may also be noteworthy, depending on the circumstances.

Although particular embodiments are expressly illustrated and described herein as methods, configured media, or systems, it will be appreciated that discussion of one type of embodiment also generally extends to other embodiment types. For instance, the descriptions of methods in connection with FIGS. 9 and 10 also help describe configured media, as well as the operation of systems like those described in connection with FIGS. 1 though 8. It does not follow that limitations from one embodiment are necessarily read into another. In particular, methods are not limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used by a software developer to wrap a thread-safe data collection with blocking-bounding semantics, the method comprising the steps of:
   obtaining a membership interface, namely, obtaining at least one procedure heading for invoking a membership interface procedure to perform a thread-safe operation to change the number of data elements in a data collection, the data collection having an organizational structure which is unspecified in the procedure heading;
   associating a membership implementation with the membership interface, namely, associating at least one procedure body which implements a thread-safe operation to change the number of data elements in the data collection, the organizational structure of the data collection being specific in the membership implementation; and
   wrapping the membership interface and the membership implementation in a blocking-bounding wrapper, namely, a wrapper which performs at least one of the following in response to an invocation of a membership interface procedure: a blocking operation which is performed on an attempt to remove a data element from the data collection when the data collection lacks a data element available for removal, a bounding operation which is performed on an attempt to add a data element to the data collection when a resource needed to add the data element is lacking.

2. The method of claim 1, further comprising associating a second membership implementation with the membership interface, and wrapping the second membership implementation in the blocking-bounding wrapper.

3. The method of claim 2, wherein the two membership implementations wrapped in the blocking-bounding wrapper collectively implement thread-safe operations to change the number of data elements in two data collections which have different organizational structures from one another.

4. The method of claim 1, further comprising wrapping a second membership implementation in a second instance of the blocking-bounding wrapper, and placing the two wrapped membership implementations in a data pipeline.

5. The method of claim 1, wherein the method comprises:
   deriving a collection class from a blocking-bounding class which provides the blocking-bounding wrapper; and
   defining a constructor for the collection class as an instance of an implementation class which provides the procedure body that implements a thread-safe operation to change the number of data elements in the data collection.

6. The method of claim 1, further comprising executing a blocking-bounding wrapped membership implementation in a parallel processing environment.

7. A multithreaded computer system, comprising:
   at least one memory configured with executable instructions;
   at least one logical processor configured to execute at least a portion of the instructions to perform a thread-safe and blocking-bounding operation on a data collection which has a number of members, namely, a thread-safe and blocking-bounding operation to change the number of members in the data collection;
   a membership interface which configures the memory and is designed to invoke a thread-safe operation to change the number of data elements in the data collection, the data collection having an organizational structure which is unspecified in the membership interface;

a membership implementation which configures the memory and is associated with the membership interface, namely, instructions which implement a thread-safe operation to change the number of data elements in the data collection, the organizational structure of the data collection being specific in the membership implementation; and a blocking-bounding wrapper which configures the memory and wraps the membership implementation and is configured to execute instructions to perform at least one of the following blocking-bounding operations in response to an invocation of the membership interface: a blocking operation to be performed on an attempt to remove a data element from the data collection when the data collection lacks a data element available for removal, a bounding operation to be performed on an attempt to add a data element to the data collection when a resource needed to add the data element is lacking.

8. The system of claim 7, wherein the membership interface comprises:

an add procedure heading for invoking a thread-safe data collection add operation, namely, a thread-safe operation which will accept a data element, attempt to add the data element to the data collection, and return a status indicating a result of the add attempt; and a remove procedure heading for invoking a thread-safe data collection remove operation, namely, a thread-safe operation which will attempt to remove a data element from the data collection, and return at least an indication of a result of the remove attempt.

9. The system of claim 7, wherein the membership interface comprises a find-and-remove procedure heading for invoking a thread-safe data collection find-and-remove operation, namely, a thread-safe operation which will attempt to find in the data collection a data element which matches at least one specified data element criterion, will attempt to remove such a data element if found, and will return at least an indication of a result of the find-and-remove attempt.

10. The system of claim 7, further comprising a membership change timeout value, whereby a blocking-bounding operation times out and returns a failure indication if the time spent attempting to change a data collection's membership exceeds the timeout value.

11. The system of claim 7, wherein the system comprises multiple data collections configuring memory, the data collections collectively exhibit at least two different organizational structures, and the executable instructions include instructions designed to attempt to add a data element to any one of the data collections using a thread-safe bounding operation.

12. The system of claim 7, wherein the system comprises multiple data collections configuring memory, the data collections collectively exhibit at least two different organizational structures, and the executable instructions include instructions designed to attempt to remove a data element from any one of the data collections using a thread-safe blocking operation.

13. The system of claim 7, wherein the system comprises multiple logical processors, and is configured to allow at least two threads to execute on different logical processors.

14. The system of claim 7, wherein the system further comprises a completion interface for marking a data collection as completed.

15. The system of claim 7, wherein the blocking-bounding wrapper per se includes a throttling semaphore and contains no thread-safety lock.

16. A storage medium configured with computer data and computer instructions for performing a method for blocking-bounding data collection access, the method comprising the steps of:

associating a membership implementation with a membership interface, the membership implementation designed to attempt to add data elements to a data collection and to attempt to remove data elements from the data collection, the data collection having an organizational structure that is specific in the membership implementation and unspecified in the membership interface; and wrapping the membership interface and the membership implementation in a blocking-bounding wrapper, namely, a wrapper which performs at least one of the following in response to invocation of a membership interface procedure: a blocking operation which is performed on an attempt to remove a data element from the data collection when the data collection lacks a data element available for removal, a bounding operation which is performed on an attempt to add a data element to the data collection when a resource needed to add the data element is lacking.

17. The configured medium of claim 16, wherein the method comprises executing instructions that derive a class and executing instructions that construct an instance of a class.

18. The configured medium of claim 16, further comprising the membership implementation executing at least some of the computer instructions to perform a thread-safe operation to change the number of data elements in the data collection.

19. The configured storage medium of claim 18, wherein the computer instructions perform at least one of the following:

a thread-safe operation to attempt to add a data element to exactly one data collection in a heterogeneous group of data collections, that is, a group of data collections which do not all have the same organizational structure;

a thread-safe operation to attempt to remove a data element from exactly one data collection in a heterogeneous group of data collections;

a thread-safe operation to attempt to find and then remove a data element from a heterogeneous group of data collections.

20. The configured medium of claim 16, wherein the method comprises executing instructions that place, into a data pipeline, multiple wrapped membership implementations for accessing data collections which have different organizational structures.

* * * * *